(12) United States Patent
Kim et al.

(10) Patent No.: US 6,750,596 B2
(45) Date of Patent: Jun. 15, 2004

(54) GENERATOR FOR USE IN A MICROELECTROMECHANICAL SYSTEM

(75) Inventors: Kwang Ho Kim, Seoul (KR); Yoon Pyo Lee, Seoul (KR); Jae Hak Jeon, Seoul (KR); Gui Eun Song, Gwacheon-si (KR)

(73) Assignee: Korea Institute of Science and Technology, Seoul (KR)

( * ) Notice: Subject to any disclaimer, the term of this patent is extended or adjusted under 35 U.S.C. 154(b) by 4 days.

(21) Appl. No.: 10/243,195

(22) Filed: Sep. 13, 2002

(65) Prior Publication Data

US 2003/0122448 A1 Jul. 3, 2003

(30) Foreign Application Priority Data

Dec. 31, 2001 (KR) ........................................ 2001-88869

(51) Int. Cl.[7] ............................................. H01L 41/113
(52) U.S. Cl. ....................................................... 310/339
(58) Field of Search ................................... 310/338, 339

(56) References Cited

U.S. PATENT DOCUMENTS 4,356,697 A * 11/1982 White .......................... 60/682
2002/0043895 A1 * 4/2002 Richards et al. ............. 310/328
2003/0160543 A1 * 8/2003 Lee et al. ..................... 310/328

* cited by examiner

Primary Examiner—Thomas M. Dougherty
(74) Attorney, Agent, or Firm—Pennie and Edmonds

(57) ABSTRACT

A micro-electro-mechanical generator has a housing, a heater, a cooler, a heat transfer member, a supporting member, and fluid. The heater is formed in the housing and the cooler is formed in the housing opposite to the heater. The heat transfer member is positioned between the heater and the cooler and is provided with a first surface facing the heater and a second surface facing the cooler. The supporting member supports the heat transfer member at an external portion of the heat transferring member and is deformable between a first position where the heat transferring member is positioned adjacent to the heater, and a second position where the heat transferring member is positioned adjacent to the cooler. The supporting member also partitions the housing into a sealed first space at a side of the heater and a second space at a side of the cooler. The fluid is charged in the sealed first space. Electric energy is obtained whenever the deformation of the supporting member provided with a piezoelectric element.

7 Claims, 8 Drawing Sheets

# GENERATOR FOR USE IN A MICROELECTROMECHANICAL SYSTEM

FIELD OF THE INVENTION

The present invention relates to generators for use in micro-electro-mechanical systems, and particularly to a micro-electro-mechanical generator designed to generate electricity by allowing a portion of a fluid chamber charged with fluid to be moved reciprocally.

BACKGROUND OF THE INVENTION

A micro-electro-mechanical system (MEMS) is one wherein mechanical components and electronic components are incorporated together in a very small size ranging from several micrometers to dozens of millimeters. In a MEMS, a number of elements requiring electricity such as micro-pumps, microprocessors, micro-sensors, micro-actuators, etc., are integrated with one another. Although voltage and current required to drive these elements of the MEMS are very minute in magnitude compared to those consumed in macro-scaled systems, it is difficult for a power supply for the elements in the MEMS to generate a proper level of the voltage and the current, as it must be very small in size for use in the micro-scaled system.

Conventionally, supply of power for known MEMS has been achieved by using a fuel cell and, in some cases, the power has been supplied to the MEMS in the form of microwaves. More recently, a need has been identified for a semi-permanent system that generates electricity by using an external environment having a temperature difference, without necessitating an external power source. The need for a semi-permanent, self-electricity generating system leads to a study on an autonomous MEMS which would mean a system operable semi-permanently in a condition isolated and independent from an external system.

In a known power generator for use in a macro-scaled system, a high temperature section and a low temperature section are provided. Working fluid is sequentially passed between the two sections in such a manner that the fluid is heated in the high temperature section to work outside, then cooled by the low temperature section, and is returned to the high temperature, repeatedly. The problem in the art is that it is difficult to apply this principle to a generator for a MEMS due to limitations in volume, a limitation in the relevant micro-fabrication technology, and influences to other electric circuits or electronic circuit components which have to be incorporated with the generator in the MEMS.

Thermoelectric modules have also been used for power generation in a MEMS. Power generation using the thermoelectric module adapts the Seebeck-effect wherein two different metals are joined to each other and a temperature difference is applied between them to induce a current.

The thermoelectric module is simple in configuration and when it operates under a small temperature difference condition it can generate electricity commensurate to that small temperature difference. The thermoelectric module could appear to provide a generator suitable for application with the MEMS as a stable energy source with its advantages including operation with reduced noise as it requires no working fluid or parts performing mechanical movement.

However, this type of generator has low operational efficiency and cannot generate sufficient levels of current and voltage. For these reasons, this type of generator is not an appropriate power source for a micro-pump for the MEMS.

There is a need in the art for a micro-electro-mechanical generator capable of providing appropriate levels of electricity for MEMS at levels greater than known MEMS generators.

SUMMARY OF THE INVENTION

It is, therefore, an object of the present invention to provide a micro-electro-mechanical generator capable of providing increased levels of electricity with respect to levels provided by known MEMS generators.

The object and other objects, which will become apparent to those skilled in the art, are accomplished with a micro-electro-mechanical generator, comprising a housing, a heating means and a cooling means disposed within the housing, with the cooling means opposite to the heating means. A heat transfer member is positioned between the heating means and cooling means, with the heat transfer member having a first surface facing the heating means and a second surface facing the cooling means.

A supporting member supports the heat transfer member at an external portion of the heat transfer member and is alternatively deformable between a first position wherein the heat transfer member is adjacent the heating means, and a second position wherein the heat transfer member is adjacent the cooling means. The supporting member partitions the housing into a sealed first space at a side of the heating means and a second space at a side of the cooling means. The sealed first space and the second spaces are respectively adapted to be charged with a first fluid and a second fluid. The supporting member is alternatively deformed in a bi-stable snapping action wherein the first position and the second position of the supporting member are two stable positions.

A power-generating means generates electricity by using the alternative deforming action by the supporting member. The power-generating means can comprise a piezoelectric element provided in the supporting member. The power-generating means can also comprise the heat transfer member and a coil disposed in the housing, wherein the heat transfer member is a permanent magnet. The first fluid is heated by the heating means to its boiling point and is cooled by the cooling means to condensation. The heat transfer member can further comprise a plurality of pins which maintain the first fluid in a liquid state with a capillary action therebetween. The first fluid is selected from the group consisting of pentane and HFC-134a.

BRIEF DESCRIPTION OF DRAWINGS

The above and other objects and features of the present invention will become more apparent from the following description of the preferred embodiments given in conjunction with the accompanying drawings.

DETAILED DESCRIPTION OF THE PRESENT INVENTION

Preferred embodiments of the present invention will now be described with reference to the accompanying drawings.

The inventive micro-electro-mechanical generator uses reciprocal movements of a moving portion of a fluid chamber charged with fluid in order to generate electricity. A change of volume in the fluid causes a volume change of the fluid chamber, which in turn results in reciprocal movements by the moving portion of the fluid chamber. When the volume of the fluid chamber is small, the moving portion of the fluid chamber is close to a heater, so that heat transfer from the heater to the moving portion begins to occur. The rise in temperature increases the volume of the fluid chamber. As a result, the moving portion is moved upward. When the volume of the fluid chamber is larger than a predetermined level, the moving portion comes into contact with a cooler. As there is now a distance from the heater, heat transfer occurs from the moving portion to the cooler. As a result, the fluid chamber begins to contract and the moving portion moves downward.

A First Embodiment

Figure 1:
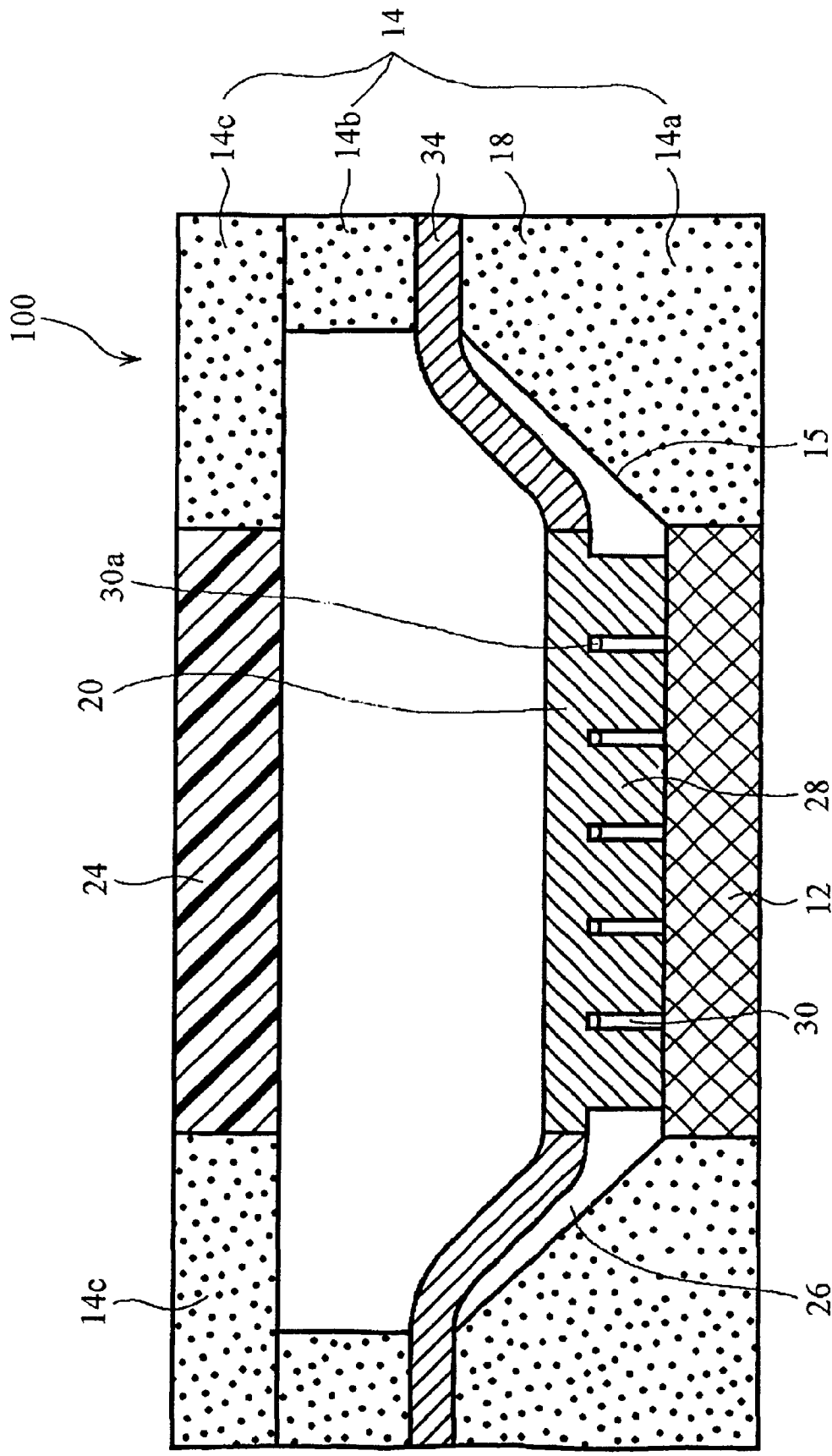
FIG. 1 illustrates a side sectional view of a micro-electro-mechanical generator in accordance with a first embodiment of the present invention, wherein a supporting member is deformed downward.

FIG. 1 shows a micro-electro-mechanical generator in accordance with a first embodiment of the present invention. As shown, the micro-electro-mechanical generator 100 includes a heating plate 12, wall portions 14, a cooling plate 24, a plurality of pins 28, working fluid 30, a heat transfer member 32, a supporting member 34 and a heat transfer member 32.

The heating plate 12 is thermally connected to a heat source (not shown) and a constant high temperature is continuously maintained thereto.

The wall portions 14 include a first wall portion 14a, a second wall portion 14b and a third wall portion 14c. The first wall portion 14a has an inclined surface 15 which extends from a same height as the heating plate 12 to the supporting member 34. The first wall portion 14a is adapted to surround the heating plate 12. The second wall portion 14b is positioned on top of the supporting member 34. The third wall portion 14c is formed on top of the second wall portion 14b, and third wall portion 14c is also adapted to surround the cooling plate 24. The wall portions 14 are, preferably, made of an adiabatic material.

The supporting member 34 supporting ends of the heat transfer member 32 defines a hermetic fluid chamber 26 together with the heat transfer member 32, the first wall portion 14a and the heating plate 12. The supporting member 34 has flexibility and elasticity such that it can resiliently deform upward or downward in a vertical direction, while resiliently supporting ends of the heat transfer member 32. While vertical upward and downward movement have been exemplified in this embodiment, it will be apparent to one skilled in the art that lateral, horizontal, diagonal movements are equally applicable while staying within the spirit of this invention, after having the benefit of this disclosure.

Figure 6:
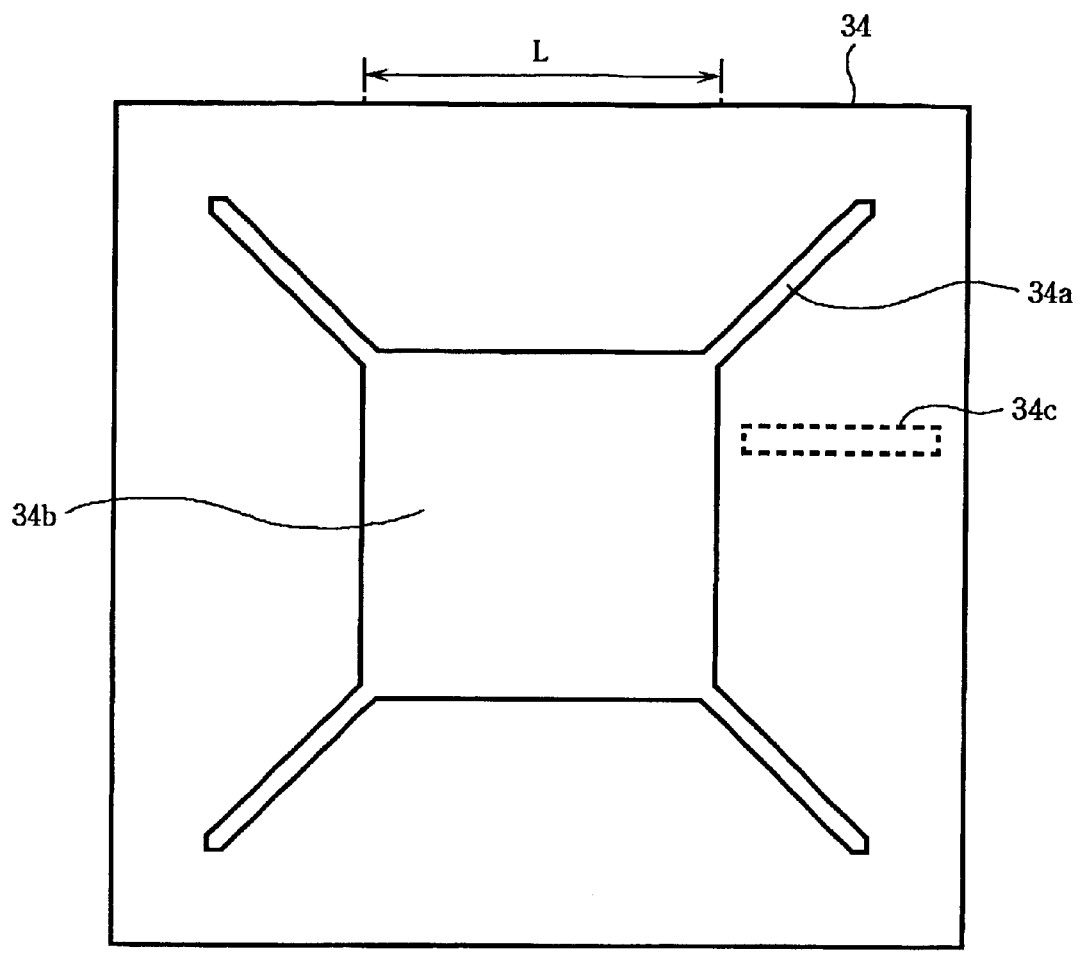
FIG. 6 shows a top planar view of the supporting member employed in the first embodiment of the present invention.

Referring to FIG. 6, the supporting member 34 is equipped with a piezoelectric element, so that the piezoelectric element generates electricity when the supporting member 34 is deformed. The supporting member 34 and/or the piezoelectric element is electrically connected to an electrical connection means (not shown) through which the electricity generated in the piezoelectric element is transmitted to the outside of the generator 100.

The heat transfer member 32 is a member moving up and down. The heat transfer member 32 is heated by the heating plate 12 and then is cooled by the cooling plate 24. Accordingly, it is preferable that the heat transfer member 32 be made of a material having a good heat transferring property.

On a bottom surface of the heat transfer member 32, the plurality of pins 28 protrude. It is preferable that the pins 28 be integrally formed with the heat transfer member 32. It is preferable that the pins 28 be made of a same material as that of the heat transfer member 32. A work space 30a represents a space between the pins 28. The pins 28 are so close to each other such that the fluid 30 charged in a work space 30a does not deviate from the work space 30a due to capillary phenomenon of each pin 28. As shown in FIG. 1, it is preferable that a width of each pin 28 be larger than that of the work space 30a.

As shown in FIG. 1, when the supporting member 34 is in a downwardly deformed position, the fluid 30 in a liquid state kept in the work space 30a is proximate to the heating plate 12. In this position, heat from the heating plate 12 is transferred to the pin 28 and the fluid 30.

In the above configuration, the working fluid 30 kept in the work space 30a experiences a phase change beyond its boiling point by the heat transferred from the heating plate 12. Increase in vapor pressure due to the temperature elevation increases the overall pressure within the fluid chamber 26. As a result, a pressure force is biased upwardly and the supporting member 34 begins to rise. When the pressure within the fluid chamber 26 exceeds a predetermined level, the supporting member 34 is deformed upward, generating electricity.

The heat transfer member 32 supported by the supporting member 34 comes into contact with the cooling plate 24, as the supporting member 34 is deformed upward. At that stage, the heat of the fluid chamber 26 is transferred to the cooling plate 24 through the heat transfer member 32.

The cooling plate 24 serves to cool the fluid chamber 26. When the supporting member 34 is deformed upward, the heat transfer member 32 contacts the cooling plate 24 and heat transfer occurs from the fluid chamber 26 including the work space 30a, to the cooling plate 24. As a result, the fluid 30 in vapor state begins to be condensed.

One operation cycle of the inventive micro-electro-mechanical generator 100 in accordance with the first embodiment will now be described.

Initially, heat is continuously transferred to the heating plate 12 from the heat source (not shown) by conduction or any other known method. Although not specifically illustrated, it will be apparent to one skilled in the art that a choice of heating means can be easily adapted to achieve substantially the same function of providing a source of temperature elevation, after having the benefit of this disclosure.

In the second step, as shown in FIG. 1, the heating plate 12 heats the working fluid 30 kept around the pins 28, i.e. in the work space 30a. Transferred heat causes a phase change from liquid to vapor in the working fluid 18. During this procedure, the volume and pressure of the fluid 30 kept in both the work space 30a and the hermetic fluid chamber 26, begin rising.

Figure 2:
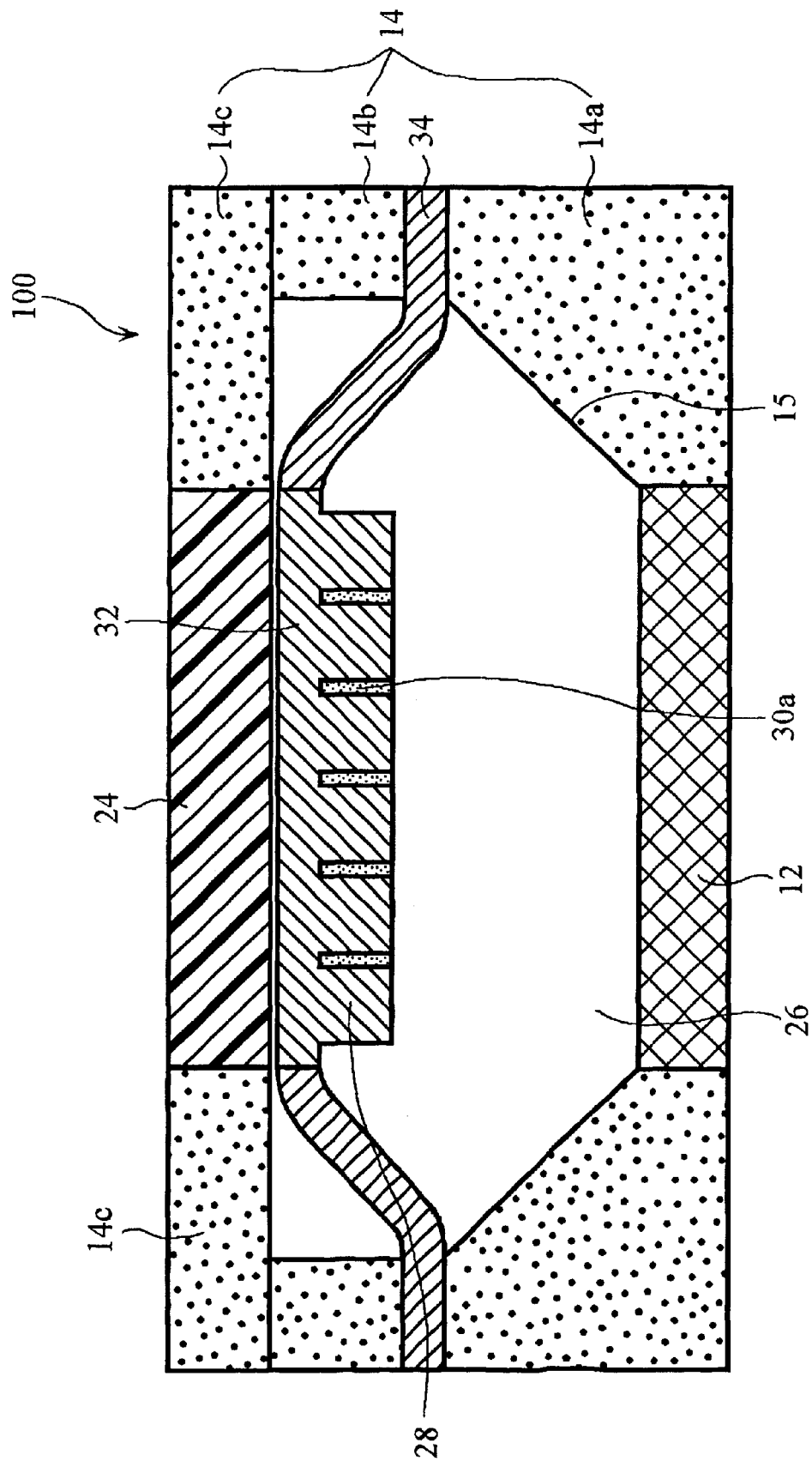
FIG. 2 depicts a side sectional view of a micro-electro-mechanical generator in accordance with the first embodiment of the present invention, wherein the supporting member has been deformed upward.

In the third step, when the rising pressure within the fluid chamber 26 exceeds a preset magnitude, the supporting member 34 is deformed upward in an instant. In other words, a snapping action results. At that moment, the heat transfer member 32 makes contact with the cooling plate 24, as shown in FIG. 2. At the same time, current is induced in the supporting member 34 made of the piezoelectric element due to the deformation of the latter.

In the fourth step, with continued contact with cold cooling plate 24, heat is depleted from the pins 28 and consequently from work space 30a and the fluid chamber 26 through the heat transfer member 32 and the temperature and pressure of the fluid chamber 26 begins decreasing. Further, the fluid 30 in vapor begins to condense. Simultaneously, relatively hot vapor charged in the fluid chamber 26 is condensed on the surface of the pins 28 which have relatively lower temperature than the hot vapor, and the condensed liquid is kept in the work space 30a between the pins 28 due to a capillary phenomenon.

Finally, when the pressure within the fluid chamber becomes less than the preset level, the supporting member 34 is snapped downward, and the pins 28 return to the position adjacent to the heating plate 12, as shown in FIG. 1. This deformation of the supporting member 34 induces current in the supporting member 34. This completes one cycle of operation.

Subsequently, a new cycle of operation begins with the initial step.

During a cycle, the supporting member 34 shows a bi-stable behavior. In other words, it alternates rapidly between two stable positions, one at the downward position and the other at the upward position. Thus, the two stable positions are relatively fixed with supporting member 34 rapidly snapping between the two stable positions. The rapid deformation of the supporting member 34 between the stable upward and downward positions is referred to herein as "the bi-stable snapping action." The bi-stable snapping action enables the generator 100 to be efficiently operated. Specially, the heat transfer member 32 travels rapidly when the position change occurs, and one cycle of operation can be completed in a reduced time interval. This enables production of a larger amount of electricity for a given period of time.

In the bi-stable snapping action, the heat transfer member 32 is not permitted to stay in a mid-position between the two stable positions of the supporting member 34 where the heat transfer member 32 is alternatively heated and cooled by the heating plate 12 and the cooling plate 24. As a result, there is a reduced possibility for the heat transfer member 32 to be heated and cooled simultaneously. This also enables the supporting member 34 to convert its position more frequently.

Figure 5:
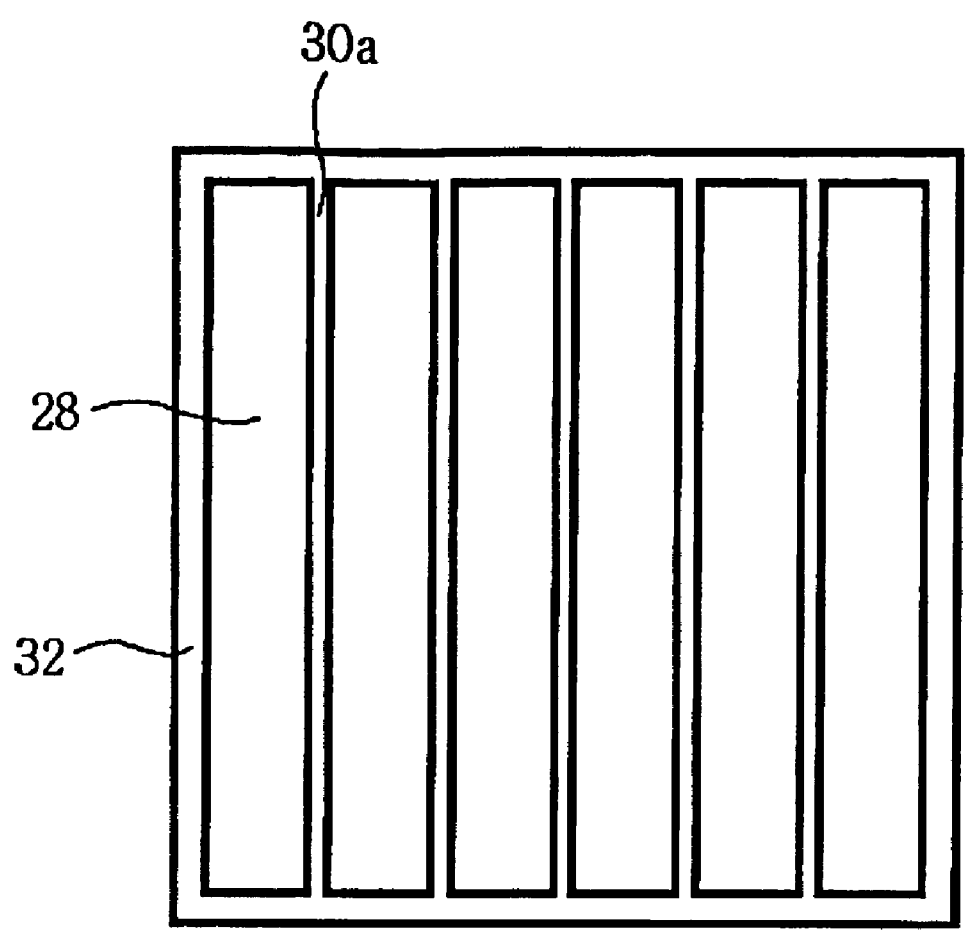
FIG. 5 illustrates a bottom view of a heat transfer member employed in the first embodiment of the present invention.

FIGS. 5 and 6 show a bottom view of the heat transfer member 32 and a top planar view of the supporting member 34, respectively. The supporting member 34 has a cutout 34b of a substantial rectangular shape and slits 34a formed along diagonal lines of the supporting member 34. In order to allow the supporting member 34 and the heat transfer member 32 to perform the bi-stable snapping action, the heat transfer member 32 and the supporting member 34 are assembled together in such a manner that the heat transfer member 32 is received by a central portion 34b of the supporting member 34 that has a size smaller than that of the heat transfer member 32. As a result, the supporting member 34 becomes naturally distorted upward or downward. With this configuration, the heat transfer member 32 and the supporting member 34 conduct the bi-stable snapping action.

The configuration of the pins 28 whereby the fluid in liquid state can be kept around them enables more efficient operation of the generator 100. More specifically, for efficient cooling action by the cooling plate 24 in the configuration shown in FIG. 2, condensed liquid is initially required to be kept near the cooling plate 24 without dropping on the heating plate 12. The capillary force by adjacent pins 28 can prevent this.

On the other hand, a space defined between the cooling plate 24 and the heat transfer member 20 may be charged with fluid. The fluid to be charged in that space may be different from the fluid in the fluid chamber 26 or same fluid as that in the fluid chamber 26. The fluid charged in the fluid chamber 26 is preferably, pentane or HFC-134a.

To achieve maximum efficiency, the optimum proportional area of heating plate 12 to the area of cooling plate 24 can be pre-determined by one skilled in the art. The heating plate 12 and the cooling plate 24 may be made of materials having suitable conductivity such as copper, aluminum, gold and the like.

A Second Embodiment

Figure 3:
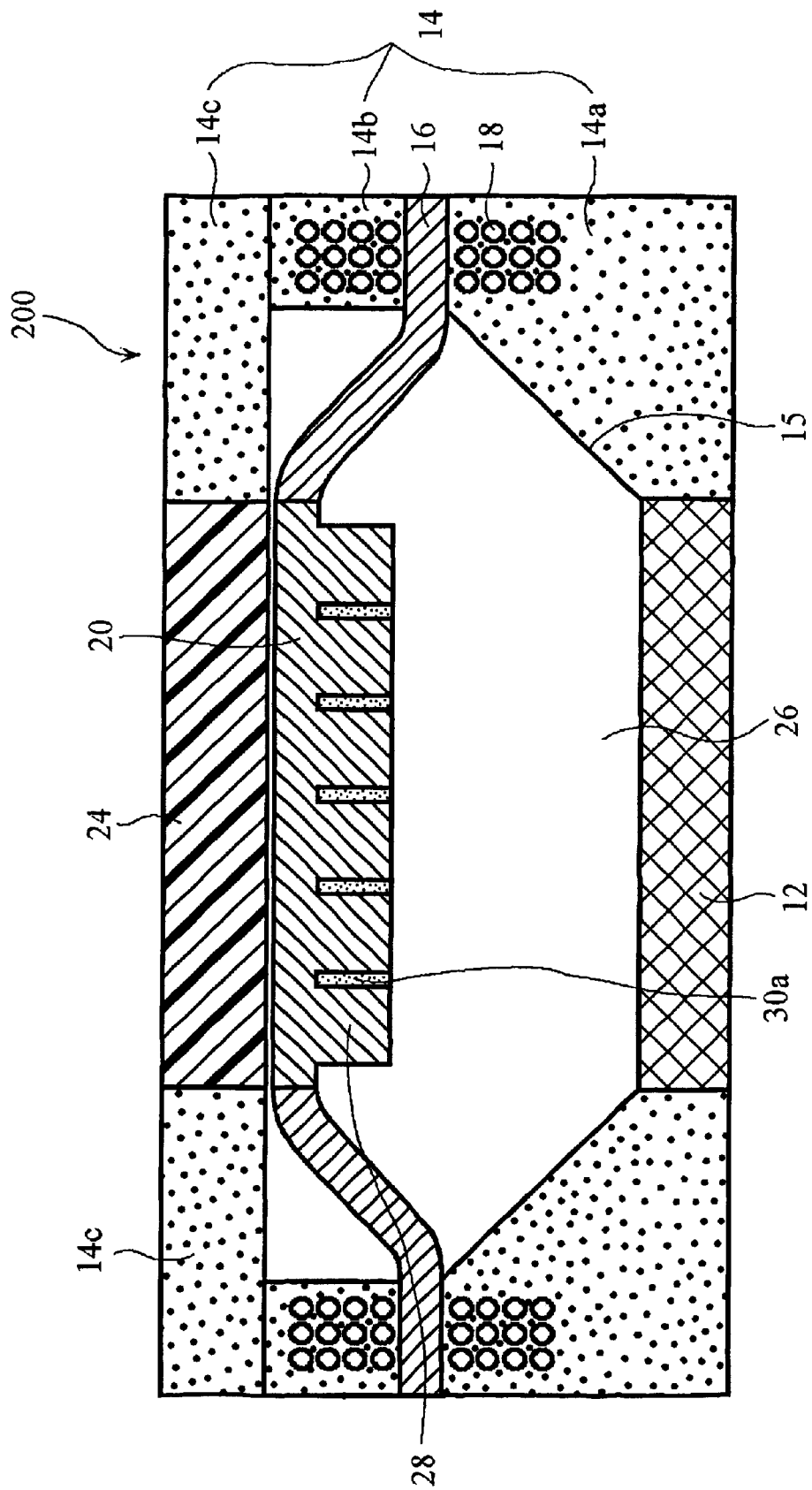
FIG. 3 illustrates a side sectional view of a micro-electro-mechanical generator in accordance with a second embodiment of the present invention, wherein the supporting member has been deformed upward.

FIG. 3 illustrates a micro-electro-mechanical generator 200 in accordance with a second embodiment of the present invention. In this description of the second embodiment, same reference numerals are designated for components which are the same as those shown in connection with the first embodiment and a separate description thereof are omitted.

Although the generator 200 is very similar to the generator 100 in accordance with the first embodiment, it has a configuration different from the generator 100 in terms of the conversion of the thermal energy of fluid 30 into electric energy.

As shown, the generator 200 is provided with a moving member 20 and a supporting member 16 supporting ends of the moving member 20 and formed on top of the first wall portion 14a. A coil 18 is formed in the first wall portion 14a and the second wall portion 14b.

In the second embodiment, the moving member 20 functions as a permanent magnet moving up and down which is heated by the heating plate 12 and then is cooled by the cooling plate 24. The moving member 20 is made of a magnet material having a good conductivity.

The moving member 20 has a plurality of pins 28 on its bottom surface. Like the first embodiment, the fluid 30 in a liquid state is placed in the work space 30a between the pins 28. Further, the pins 28 are, preferably, made of a same material as that of the moving member 20. It is also preferable that the pins 28 be integrally formed with the moving member 20.

Figure 4:
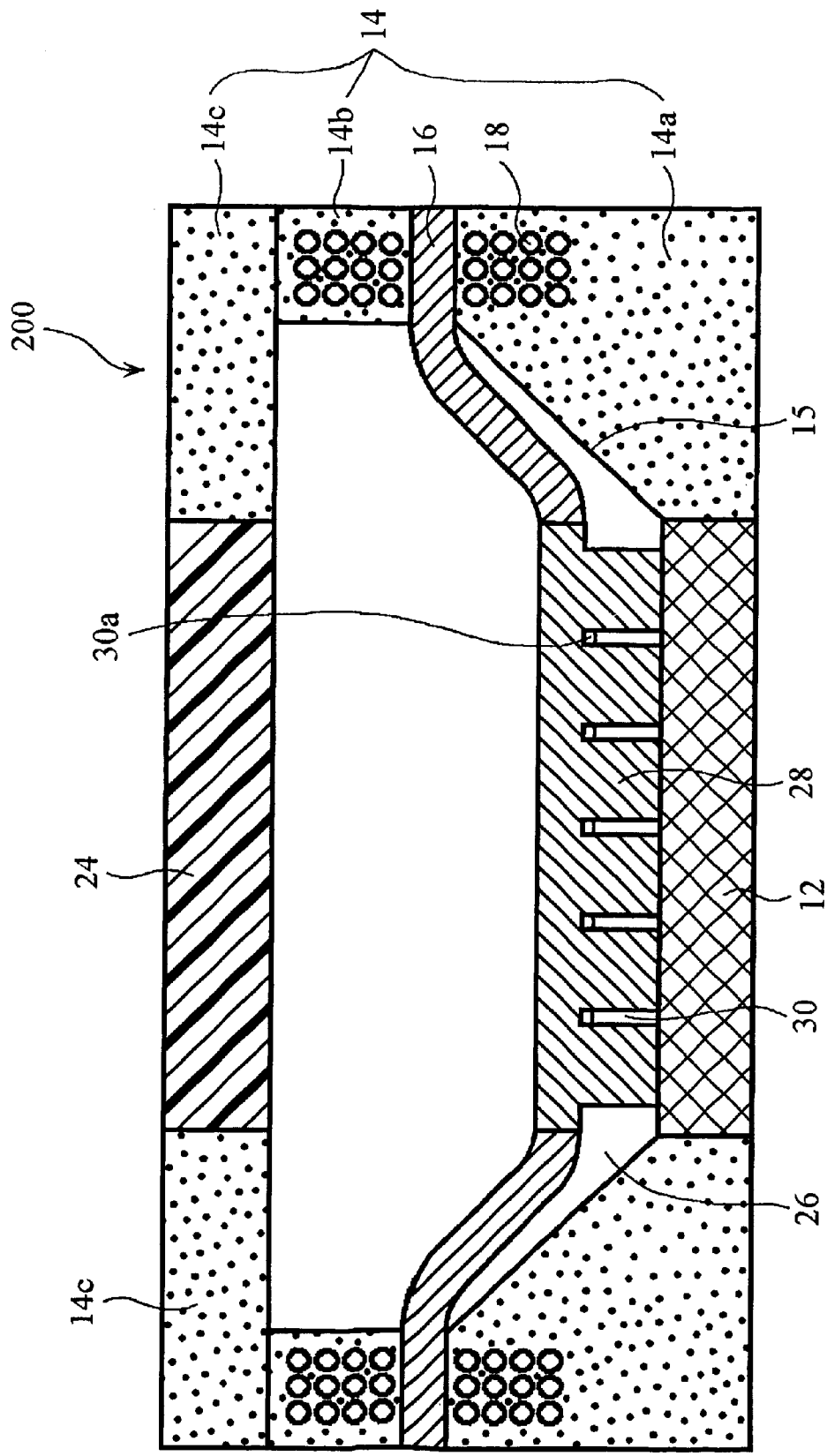
FIG. 4 is a side sectional view of a micro-electro-mechanical generator in accordance with the second embodiment of the present invention, wherein the supporting member has been deformed downward.

The supporting member 16 can be made of a material with elasticity and flexibility and is adapted to upward and downward deformation as shown in FIGS. 3 and 4. Whenever the supporting member 16 conducts the snapping action, the moving member 20 is moved upward or downward.

In this configuration, moving member 20 makes a relative movement with respect to the coil 28 in a cycling between upward and downward snapping action of the supporting member 16. This allows an electromotive force to be induced in the coil 28. The current induced in the coil 28 is transmitted to the outside through an electrical connection means (not shown) through which electricity induced in coil 18 is transmitted as a source to the outside of the generator 200. Position of the coil 18 in the wall portions 14a and 14b is determined by considering the movements of the moving member 20 so that greater current can be induced in the coil 18.

A Third Embodiment

Figure 7:
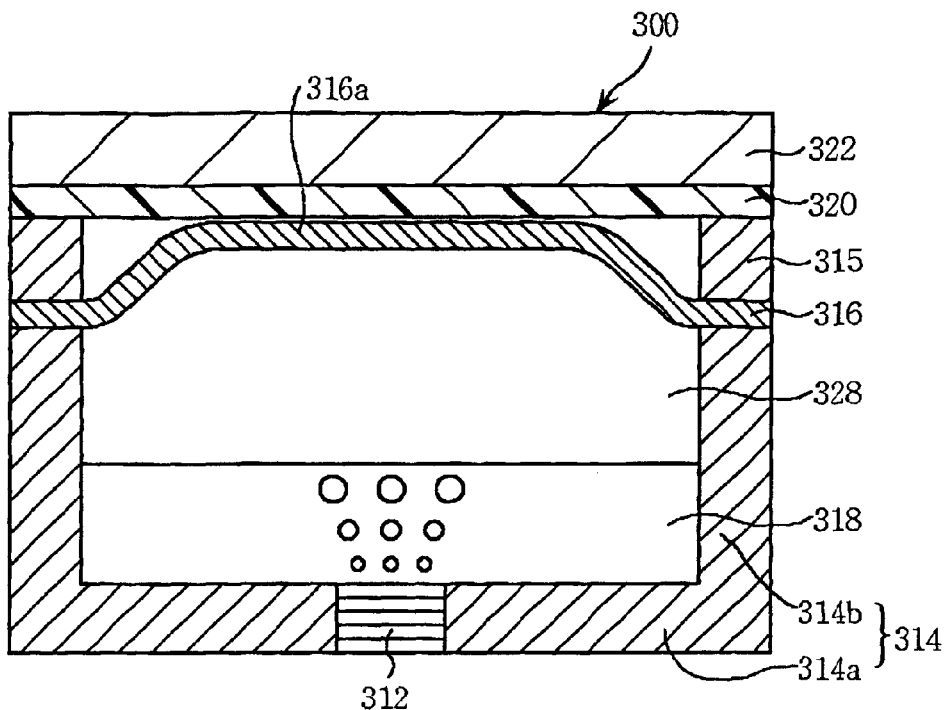
FIG. 7 illustrates a side sectional view of a micro-electro-mechanical generator in accordance with a third embodiment of the present invention.

FIG. 7 shows a micro-electro-mechanical generator in accordance with a third embodiment of the present invention.

As shown, the micro-electro-mechanical generator 300 includes a heating plate 312, a first adiabatic portion 314, a second adiabatic portion 315, a diaphragm or thin film 316, working fluid 318, a piezoelectric material 320, and a cooling plate 322. In this embodiment, a liquid working fluid 318 is contemplated.

The heating plate 312 is thermally connected to a heat source (not shown) and a constant high temperature is continuously maintained thereto.

The first adiabatic portion 314 is provided with a lower portion 314a adapted to be adjacent and surrounding the heating plate 312 at a vertical level flush therewith, and a wall 314b extending vertically upward from the ends of the lower portion 314a. The heater 312, the lower portion 314a, the wall 314b and the thin film 316 define a sealed space having a volume therein.

More specifically, the thin film 316 is adapted on an upper surface of the wall 314b; and the thin film 316, the wall 314b, the lower portion 314a and the heating plate 312 define a hermetical fluid chamber 328. The thin film 316 has a flexible central portion 316a that can move up and down. The fluid chamber 328 confines working fluid 318 so that the working fluid 318 is exposed to the heating plate 312. The working fluid 318 is not required to charge the entire volume of the fluid chamber 328 and it is preferable that working fluid 318 be partially charged in the fluid chamber 328.

In the above configuration, a portion of the working fluid 318 experiences a phase change beyond its boiling point by the heat transferred from the heating plate 312. Increase in vapor pressure due to the high temperature increases the overall pressure within the fluid chamber 328. As a result, the central portion 316a of the thin film 316 is pushed upwardly.

The piezoelectric material 320 is adapted above the thin film 316 such that there is a distinct separation from the thin film 316. As pressure pushes the central portion 316a, it too presses the piezoelectric material 320 during its upward movement. The pressing force of the fluid chamber 328 that is exerted to the piezoelectric material 320 by the central portion 316a of the thin film 316 is converted to electric energy by the piezoelectric material 320. The increase of pressure within the fluid chamber 328 pushes the central portion 316a upwards, resulting in the central portion 316a pressing the piezoelectric material 320, with piezoelectric material 320 generating electricity.

The second adiabatic portion 315 is adapted between the piezoelectric material 320 and the thin film 316 to increase the heat insulation effect of the fluid chamber 328.

The cooling plate 322 is adapted on an upper surface of the piezoelectric material 320. The cooling plate 322 serves to keep the piezoelectric material 320 in a low temperature state.

With this configuration, the thin film 316 is initially deformed upward to press piezoelectric material 320 to generate electricity, and continued contact by the thin film 316 against piezoelectric material 320 allows the heat of the thin film 316 to be transferred to the cooling plate 322 through the piezoelectric material 320. The heat transfer results in lowering of the temperature around the central portion 316a of the thin film 316 and consequently, the pressure within the fluid chamber 328 is also lowered, allowing the central portion 316a to begin descending.

An operation of the inventive micro-electro-mechanical generator 300 in accordance with the third embodiment will now be described.

Initially, heat is continuously transferred to the heating plate 312 from the heat source (not shown).

In the second step, the transferred heat elevates the temperature of the working fluid 318 and a phase change from liquid to vapor occurs in a portion of the working fluid 318. During this procedure, the volume and pressure of the fluid in vapor within the hermetic fluid chamber 328, begin rising.

In the third step, the increased pressure upwardly deforms the thin film 316 to allow the central portion 316a to be raised. The central portion 316a is contacted to the piezoelectric material 320 kept in a low temperature state by the cooling plate 322.

In the fourth step, the pressure being increased presses against the piezoelectric material 320. On being depressed, the piezoelectric material 320 converts the pressing force into electric energy.

Finally, heat is depleted from the upper portion of the fluid chamber 328 including the thin film 316 to the cooling plate 322. As a result, the pressure in the fluid chamber 328 is lowered and the central portion 316a of the thin film 316 moves downward to its initial position.

A Fourth Embodiment

Figure 8:
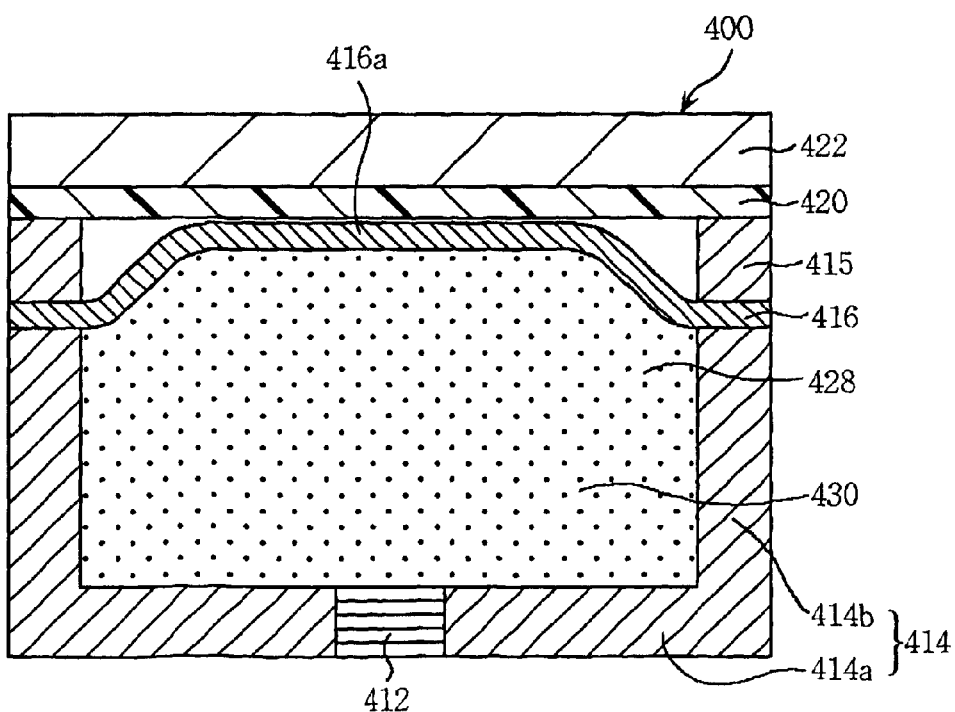
FIG. 8 depicts a side sectional view of a micro-electro-mechanical generator in accordance with a fourth embodiment of the present invention.

FIG. 8 shows a micro-electro-mechanical generator 400 in accordance with a fourth embodiment.

The micro-electro-mechanical generator 400 shown in FIG. 8 is similar to the generator 300 in accordance with the third embodiment, except that in this fourth embodiment, the working fluid 430 in the fluid chamber 428 is preferably, a gas.

In the fourth embodiment, the volume change of the fluid chamber 428 is caused by direct volume expansion of the gas itself, unlike the third embodiment where the phase change from liquid to vapor generates the volume change in fluid chamber 328. Accordingly, a response delay due to the phase change when liquid is used as the working fluid is absent in the micro-electro-mechanical generator 400.

Further, the micro-electro-mechanical generator 300 may show a performance difference depending on its spatial posture, i.e. whether the generator is in a tilted state or not, whereas the micro-electro-mechanical generator 400 can provide a constant output regardless of its position.

A Fifth Embodiment

Figure 9:
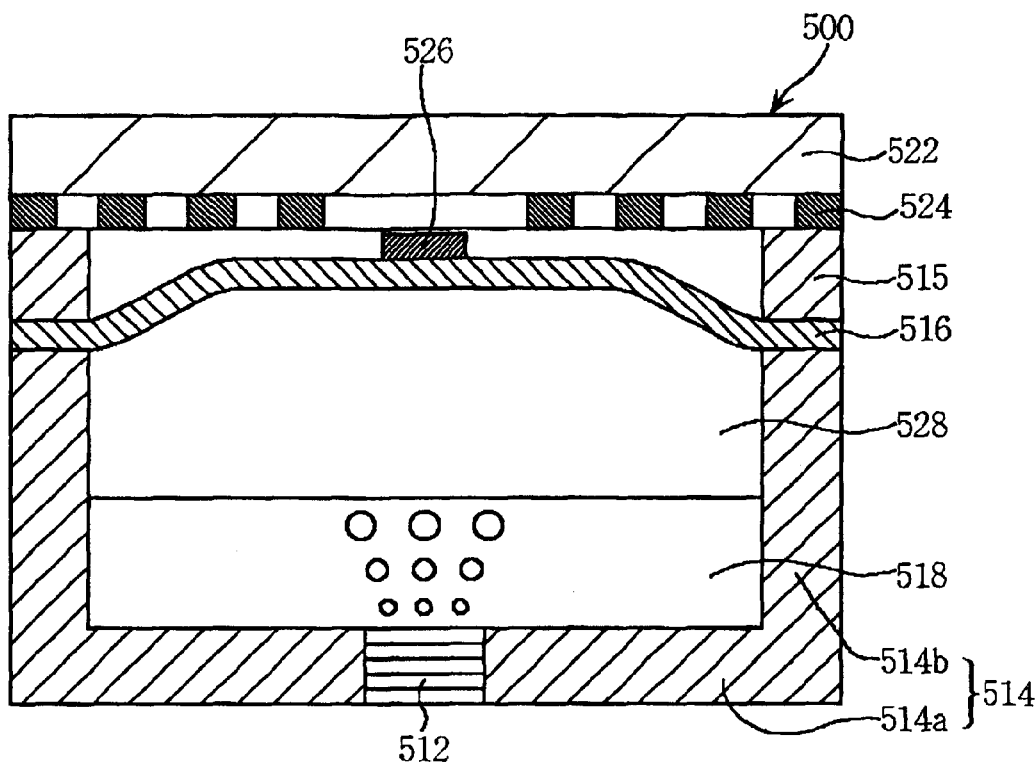
FIG. 9 illustrates a side sectional view of a micro-electro-mechanical generator in accordance with a fifth embodiment of the present invention.

FIG. 9 illustrates the inventive micro-electro-mechanical generator 300 in accordance with the fifth embodiment.

Although the generator 500 is nearly similar to the generator 300 in accordance with the third embodiment, it has a configuration different from the generator 300 in terms of the conversion of the thermal energy of fluid into electric energy. As shown, the generator 500 in accordance with the fifth embodiment is provided with a permanent magnet 526 formed on top of a thin film 516, and a coil 524 is adapted above the permanent magnet 526. In this configuration, the permanent magnet 526 makes a relative movement with respect to the coil 524 with the upward and downward deformation of the thin film 516. This allows an electromotive force to be induced in the coil 524. The permanent magnet 526 comes into contact with the cooling plate 522 adapted on top of coil 524 during its upward movement through the coil 524.

Figure 10:
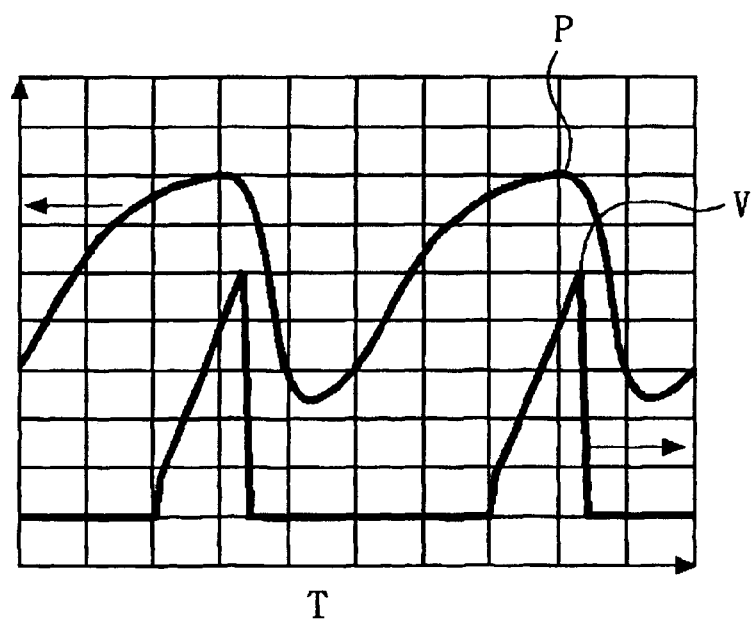
FIG. 10 is a graph showing change of pressure exerted by a thin film on a piezoelectric material of the third embodiment of the present invention and a consequent output voltage change, relative to change in time.

The graph in FIG. 10 plots performance curves for the micro-electro-mechanical generator 300 in accordance with the third embodiment using piezoelectric material 320 and liquid working fluid 318, where the change of pressure P exerted on the piezoelectric material by the thin film, and the consequent change of output voltage V, are shown with respect to time change T.

The inventive micro-electro-mechanical generator may use waste heat from a power plant, a chemical plant, an incinerator, etc., as its energy source. When it is made in a miniature size, it may be applied as the main power source or supplementary power source for a mobile phone, a personal digital assistant (PDA), a lap top computer or a DNA chip, using for instance, body heat or solar heat as thermal energy source.

While the present invention has been shown and described with respect to the particular embodiments, it will be apparent to those skilled in the art that many exchanges and modifications may be made without departing from the spirit and scope of the invention as defined in the appended claims.

What is claimed is:

1. A micro-electro-mechanical generator, comprising:
   a housing;
   a heating means disposed within said housing;
   a cooling means disposed within said housing, and opposite to said heating means;
   a heat transfer member positioned between said heating means and said cooling means, the heat transfer member having a first surface facing said heating means and a second surface facing said cooling means;
   a supporting member supporting said heat transfer member at an external portion of said heat transfer member and being deformable between a first position wherein said heat transfer member is positioned adjacent to said heating means, and a second position wherein said heat transfer member is positioned adjacent to said cooling means, and the supporting member partitioning said housing into a sealed first space at a side of said heating means and a second space at a side of said cooling means, wherein the sealed first space and the second spaces, respectively adapted to be charged with a first fluid and a second fluid; and
   a power-generating means generating electricity by using said deforming action by said supporting member.

2. The micro-electro-mechanical generator of claim 1, wherein said power-generating means comprises a piezoelectric element provided in said supporting member.

3. The micro-electro-mechanical generator of claim 1, wherein said power-generating means comprises said heat transfer member and a coil disposed in said housing, wherein said heat transfer member is a permanent magnet.

4. The micro-electro-mechanical generator of claim 1, wherein said first fluid is heated by said heating means to its boiling point and is cooled by said cooling means to condensation.

5. The micro-electro-mechanical generator of claim 1, wherein said heat transfer member further comprises a plurality of pins, the pins maintaining said first fluid in a liquid state with a capillary action therebetween.

6. The micro-electro-mechanical generator of claim 1, wherein said supporting member is alternatively deformed in a bi-stable snapping action wherein said first position and said second position of said supporting member are two stable positions.

7. The micro-electro-mechanical generator of claim 1, wherein said first fluid is selected from the group consisting of pentane and HFC-134a.

* * * * *